US012776580B1

(12) United States Patent
Morimoto et al.

(10) Patent No.: US 12,776,580 B1
(45) Date of Patent: Oct. 27, 2026

(54) MODIFIED STRUCTURES FOR REDUCING CAPACITIVE COUPLING

(71) Applicant: Meta Platforms Technologies, LLC, Menlo Park, CA (US)

(72) Inventors: Yasuo Morimoto, Cupertino, CA (US); Boon Shiu, Palo Alto, CA (US); Javier Rodriguez De Luis, Kirkland, WA (US); Jiang Zhu, Cupertino, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 242 days.

(21) Appl. No.: 18/169,863

(22) Filed: Feb. 15, 2023

(51) Int. Cl.
*H01Q 9/04* (2006.01)
*G02B 27/01* (2006.01)
*H01Q 1/27* (2006.01)

(52) U.S. Cl.
CPC ....... *H01Q 9/0464* (2013.01); *G02B 27/0176* (2013.01); *H01Q 1/273* (2013.01)

(58) Field of Classification Search
CPC ...... G02B 27/0176; H01Q 1/22; H01Q 1/243; H01Q 1/273; H01Q 1/24; H01Q 1/38; H01Q 9/0464
See application file for complete search history.

(56) References Cited

U.S. PATENT DOCUMENTS

| | | | | |
|---|---|---|---|---|
| 2012/0050114 A1* | 3/2012 | Li | H01Q 1/243 | 343/702 |
| 2012/0122342 A1* | 5/2012 | Dangler | H01R 13/6587 | 29/874 |
| 2012/0325522 A1* | 12/2012 | Ogino | H01Q 1/38 | 174/250 |
| 2013/0034740 A1* | 2/2013 | Giachino | C09J 177/00 | 977/773 |
| 2017/0256843 A1* | 9/2017 | Hu | H01Q 21/28 | |
| 2023/0041218 A1* | 2/2023 | Choi | H01Q 1/243 | |
| 2024/0258691 A1* | 8/2024 | Yamaura | H01Q 1/52 | |

* cited by examiner

*Primary Examiner* — Dimary S Lopez Cruz
*Assistant Examiner* — Anna N Hamadyk
(74) *Attorney, Agent, or Firm* — Foley & Lardner LLP

(57) ABSTRACT

The disclosed system may include a conductive frame, at least one transparent substrate that is structurally secured by the conductive frame, a transparent antenna applied to a surface of the transparent substrate, and an antenna feed electrically positioned at an insertion point between the conductive frame and the transparent antenna. In this system, the conductive frame, the transparent substrate, the transparent antenna, and/or the antenna feed are modified to reduce conductive capacitance between the conductive frame and the transparent antenna at the insertion point. Various other apparatuses and mobile electronic devices (including augmented reality glasses) are also disclosed.

14 Claims, 14 Drawing Sheets

MODIFIED STRUCTURES FOR REDUCING CAPACITIVE COUPLING

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
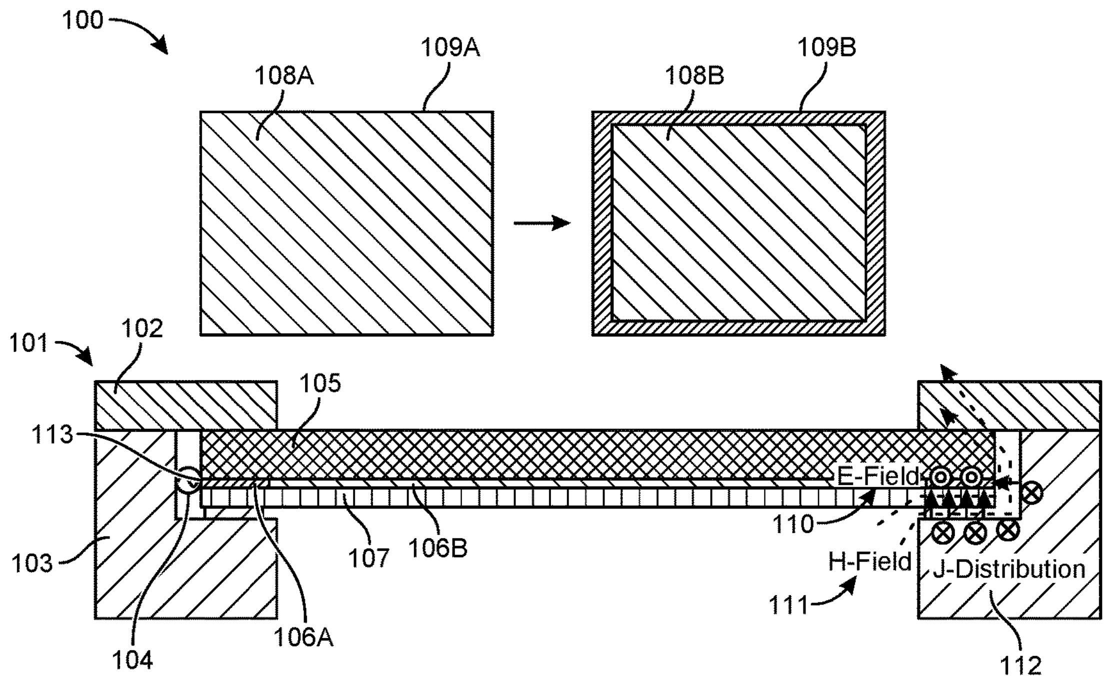
FIG. 1 illustrates an embodiment of a mobile electronic device that implements one or more shielding structures to reduce capacitive coupling.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure generally describes different types of structures or modifications to structures that may be used to reduce capacitive coupling that may occur in mobile electronic devices. In some cases, capacitive coupling may occur when a conductive (e.g., metal) frame is positioned near an antenna. For instance, in some examples, a metal augmented reality (AR) glasses frame may include and may be implemented in conjunction with a transparent antenna that potentially has an active dimming layer. In such AR glasses, having a small form factor, it may be difficult to provide sufficient clearance between lossy materials such as the transparent antenna (and active dimming layer) and the surrounding metallic enclosure. Having sufficient clearance between these conductive and lossy structures may allow for improved antenna performance by reducing the capacitive coupling that may otherwise occur between the metal frame and the lossy electronic components.

The embodiments described herein may provide additional clearance in a variety of different ways. In some cases, this additional clearance may be provided by placing nonconductive material (e.g., a nonconductive resin) between the active dimming layer and the metallic enclosure. In such cases, the resin material may be injected into the metallic frame of the AR glasses between the frame and the active dimming layer. In other cases, the embodiments herein may increase the separation of the metal frame and the active dimming layer by changing the design of different AR glasses substructures to provide increased distance between the active dimming layer and the metallic enclosure. This increased distance may prevent the lossy active dimming layer from interfering with the metal AR glasses frame or may at least reduce the losses that would otherwise occur due to coupling. These and other concepts will be described further below with regard to FIGS. 1-13.

Features from any of the embodiments described herein may be used in combination with one another in accordance with the general principles described herein. These and other embodiments, features, and advantages will be more fully understood upon reading the following detailed description in conjunction with the accompanying drawings and claims.

FIG. 1 illustrates an embodiment 100 in which one or more components of a system or mobile electronic device 101 may be modified or initially formed to reduce conductive capacitance between a conductive frame and a transparent antenna. For instance, the mobile electronic device 101 of FIG. 1 may include a conductive frame 103. The conductive frame 103 may provide structural support for the device and may be made, at least partially, from a conductive material (e.g., metal, conductive plastic, conductive foam, etc.). The conductive frame, at least in some cases, may include the temple arms and lens frames of a pair of AR glasses. While lenses are frequently used in the embodiments herein, it will be recognized that the lenses may be substantially any type of transparent substrate, including transparent films, glass covers for watch displays, transparent plastic covers, or other types of transparent substrate.

Thus, in FIG. 1, the cross section of conductive frame 103 may include a lens frame for a pair of AR glasses. The lens frame may include a protective cover 102 that covers at least a portion of the frame and at least a portion of the lens 105. The lens 105 may be structurally secured by the conductive frame 103 and/or the protective cover 102. The lens 105, as noted above, may be one of many different transparent substrates that may be used with the embodiments herein. The lens 105 may include an outer protective layer that is transparent to the human eye. The lens structure may also include a transparent antenna applied to an inner surface of the lens 105, as well as an active dimming layer 107. The active dimming layer may include indium tin oxide (ITO), metal mesh, indium zinc oxide (IZO), silver alloy, silver nanowire (SNW), layered combinations of these materials (e.g., ITO-silver alloy-ITO, IZO-silver alloy-IZO, metal mesh-ITO, etc.), or other materials that change polarization when electrically activated. Such changes in polarization may allow more or less light to reach the user's eyes, thus allowing for use of the glasses indoors and outdoors.

The lens structure (or other transparent substrate) may further include an antenna feed 104 electrically positioned at an insertion point 113 between the conductive frame 103 and a transparent antenna 106B. The transparent antenna 106B may include a transparent metal mesh or other conductive, transparent material capable of acting as a radiating element in an antenna. In some embodiments, a gap or slot may be created between the conductive frame and the transparent antenna, thereby forming a slot antenna between the transparent antenna and the conductive frame of the mobile electronic device. In other embodiments, different types of antennas may be created in the mobile electronic device 101, including monopole antennas that may be adjacent to and may couple to the conductive enclosure, dipole antennas that may similarly be adjacent to and may couple to the conductive enclosure, or other types of antennas. In the mobile electronic device 101, any of the conductive frame, the lens, the transparent antenna, and/or the antenna feed may be modified to reduce conductive capacitance between the conductive frame and the transparent antenna at the insertion point 113.

For instance, in one example, the transparent antenna 106B may be modified to include a transparent conductor 106A. The transparent conductor may have a relatively low level of sheet resistance and, at least in some cases, may have a level of resistance that is one or two orders of magnitude less than the resistance of the transparent antenna 106B. This portion of transparent conductor 106A may be short relative to the length of the transparent antenna 106B. Thus, in some cases, the transparent conductor 106A may have a length that is equivalent to the width of the conductive frame 103 at the insertion point 113 of the antenna feed 104.

Additionally or alternatively, the transparent conductor 106A may have a resistance level that is below a specified maximum threshold resistance. In some cases, the maximum threshold resistance may be, for example, 0.01 Ohms/sq, while the sheet resistance of the transparent antenna 106B may be approximately 2 Ohms/sq. The top portion of FIG. 1 illustrates a top view of the transparent antenna 106B, referred to in the top view as 108A. The transparent antenna 108A is shown in a top view to illustrate the modifications that can be made to reduce conductive coupling between the transparent antenna 108A and the conductive frame 103.

Adding a relatively thin transparent conductor 109A or adding a thicker transparent conductor 109B may increase the separation between the conductive frame 103 (which may act as a radiating element of the mobile electronic device 101) and the transparent antenna 108B. In some cases, the transparent conductor may be formed onto the circumference of the lens 105 (or other transparent substrate) and may follow one or more contours of the lens. Thus, if the lens is round, square, oblong, or is otherwise shaped, the transparent conductor 109B may follow and may form a circumference around the outer edge of the lens 105.

As indicated above, while the transparent conductor 109B may have a sheet resistance that is below a specified maximum threshold value, the remaining portions of the transparent antenna 108B may include a resistance level that is above a specified minimum threshold resistance. This area of low resistance (e.g., 106A/109B) may allow current to flow more easily from the antenna feed 104 to the transparent antenna 106B. Then, as can be seen on the right side of FIG. 1, the flow of the electric field 110, the flow of the magnetic field (111), and the electric power distribution (e.g., J-distribution 112) may flow in a manner that reduces coupling between the conductive frame 103 and the transparent antenna 106B.

Figure 2A:
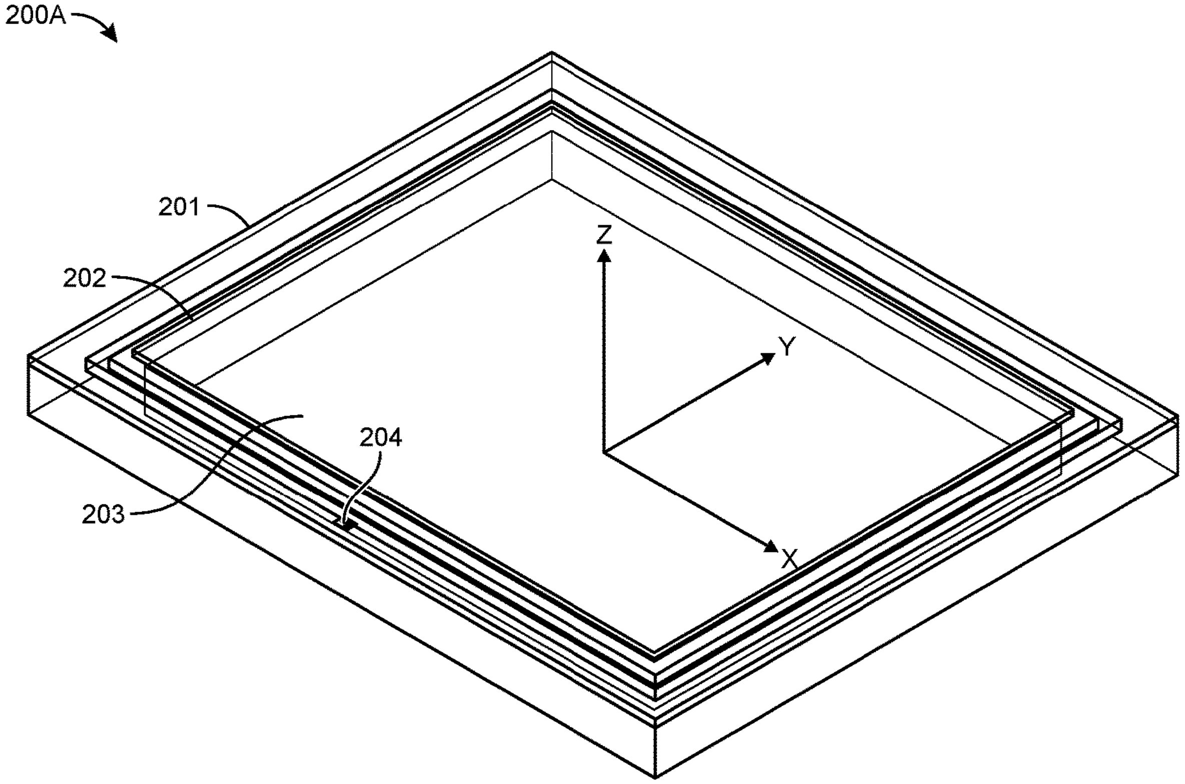
FIG. 2A illustrates a front perspective view of a portion of a mobile electronic device that implements one or more shielding structures to reduce capacitive coupling.
Figure 2B:
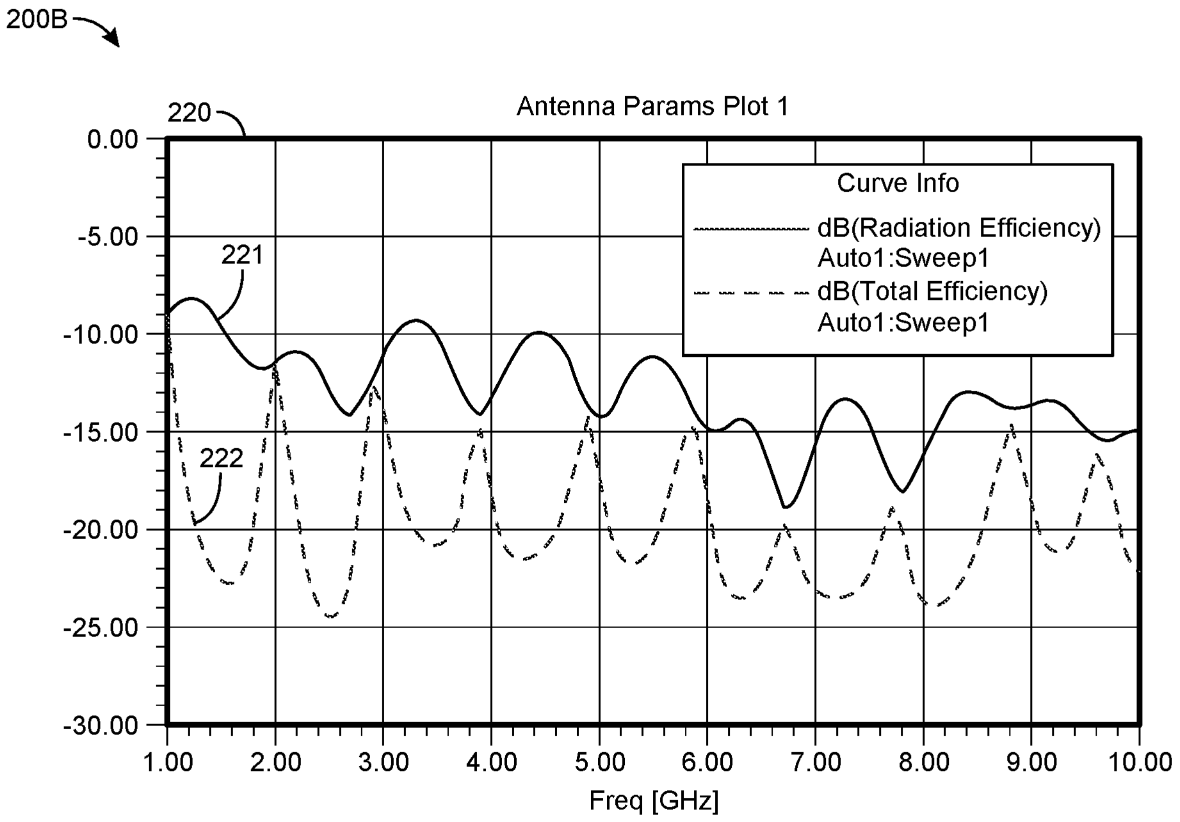
FIG. 2B illustrates a chart showing efficiency measurements of a mobile electronic device that implements one or more of the shielding structures described herein.

FIG. 2A illustrates an embodiment 200A of a front perspective view of the embodiment shown in FIG. 1. The embodiment 200A includes a mobile electronic device (e.g., a lens of a pair of AR glasses or the face of a smartwatch) with a conductive frame 201. The conductive frame may provide structural support for a lens 203 and a transparent conductor 202. The transparent conductor 202 may be electrically connected to the antenna feed 204, which may also be electrically connected to the conductive frame 201. The transparent conductor 202 may allow the current from the antenna feed 204 to flow directly to an inner transparent antenna, with little to no conductive coupling to the conductive frame 201. By reducing the conductive coupling, as shown in embodiment 200B of FIG. 2B, antenna gain or efficiency (Y1) may be improved with a resulting radiation efficiency 221 in chart 220 and total efficiency 222 that is high above an established baseline. These measurements (221 & 222) may result from the reduced-coupling embodiments of FIGS. 1 and 2A.

Figure 3A:
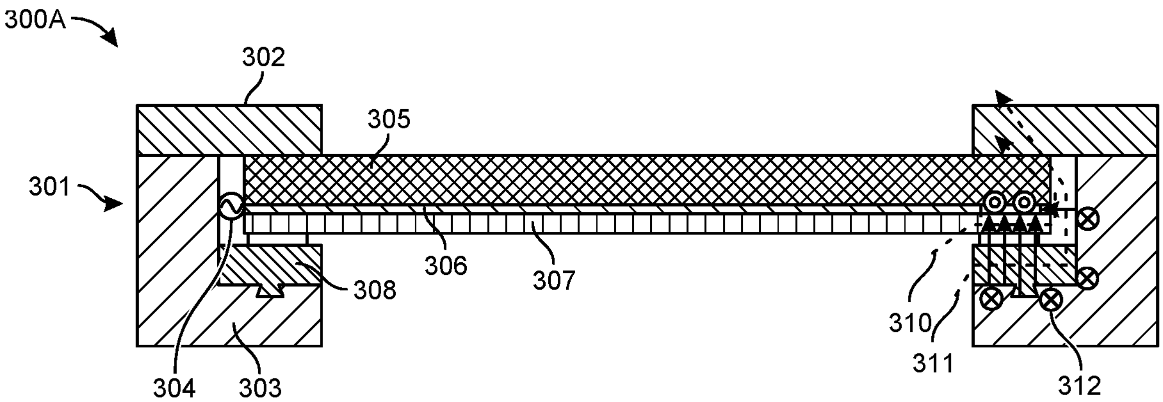
FIGS. 3A and 3B illustrate embodiments of mobile electronic devices that implement one or more shielding structures to reduce capacitive coupling.
Figure 3B:
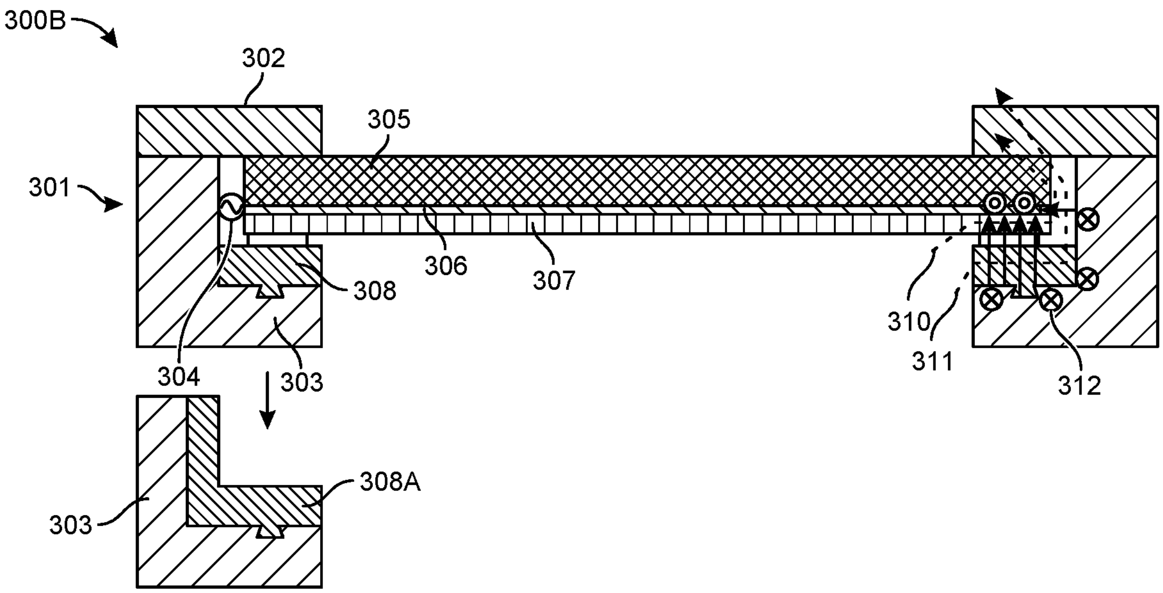

FIGS. 3A and 3B illustrate embodiments 300A and 300B in which a conductive frame 303 is modified to create greater separation between the conductive frame 303 and a transparent antenna 306. The mobile electronic device 301 of FIG. 3A may be similar to mobile electronic device 101 of FIG. 1. The conductive frame 303 may be part of a smartwatch or part of a pair of AR glasses and may radiate as a component part of an antenna. The antenna feed 304 may be electrically connected to the conductive frame 303 as well as connected to the transparent antenna 306. As in FIG. 1, the mobile electronic device 301 may include a lens 305 and an active dimming layer 307 that sandwich the transparent antenna 306. The mobile electronic device 301 may also include a protective cover 302. In this embodiment, the conductive frame 303 may be modified to include at least some portion of nonconductive material. This nonconductive material may be referred to herein as a "dielectric spacer."

The dielectric spacer 308 may be inserted or injected into the conductive frame 303. Thus, in such cases, the conductive frame 303 may be modified to include the dielectric spacer 308 between the metallic frame and the transparent antenna 306. The dielectric spacer 308 may be a material that has a dielectric constant that is below a specified maximum threshold level. This low dielectric constant may allow the dielectric spacer 308 to act as an insulator, decreasing the flow of current or decreasing conductive coupling between the conductive frame 303 and the transparent antenna 306.

This may have an effect on the e-field 310, the h-field 311, and/or the j-distribution 312, such that the magnetic h-field may now run primarily through the dielectric spacer 308, as opposed to the small area between the conductive frame 303 and the transparent antenna 306. Moreover, the j-distribution 312 may be more spread out, indicating that less power is being transferred from the conductive frame 303 to the transparent antenna 306. This, in turn, may allow the mobile electronic device 301 to operate more efficiently, using less power to transmit and receive the same information.

In some cases, the dielectric spacer 308 may be a resin, a structural foam, or other insulating material. The dielectric spacer 308 may be co-injected into the conductive frame. In some cases, this co-injection may occur during initial manufacturing, while in other cases, the co-injection may occur after the mobile electronic device has been manufactured. The dielectric spacer may provide at least a minimum level of clearance between the conductive frame and the transparent antenna. This minimum level of clearance may be specified for each device and may be unique to each device to provide the specified minimum level of clearance. This minimum level of clearance may, in turn, may provide a minimum amount of reduction in capacitive coupling.

Figure 4A:
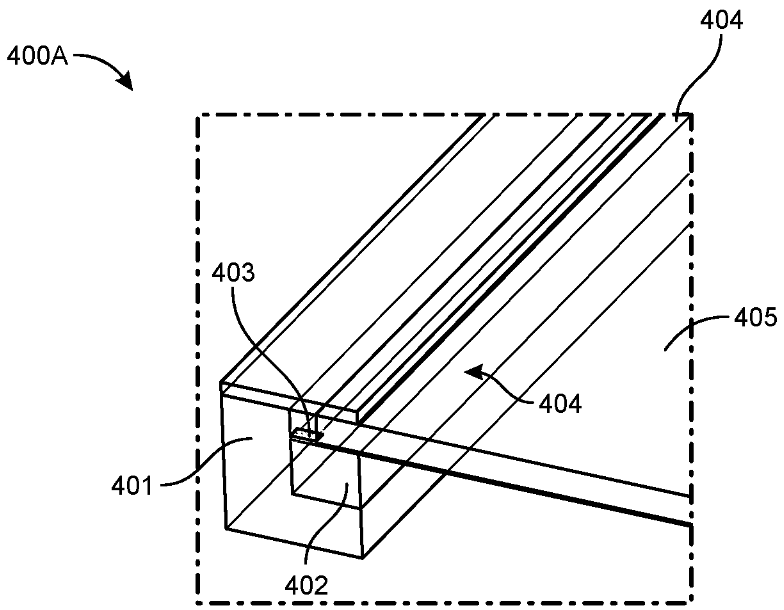
FIG. 4A illustrates a front perspective view of a portion of a mobile electronic device that implements one or more shielding structures to reduce capacitive coupling.
Figure 4B:
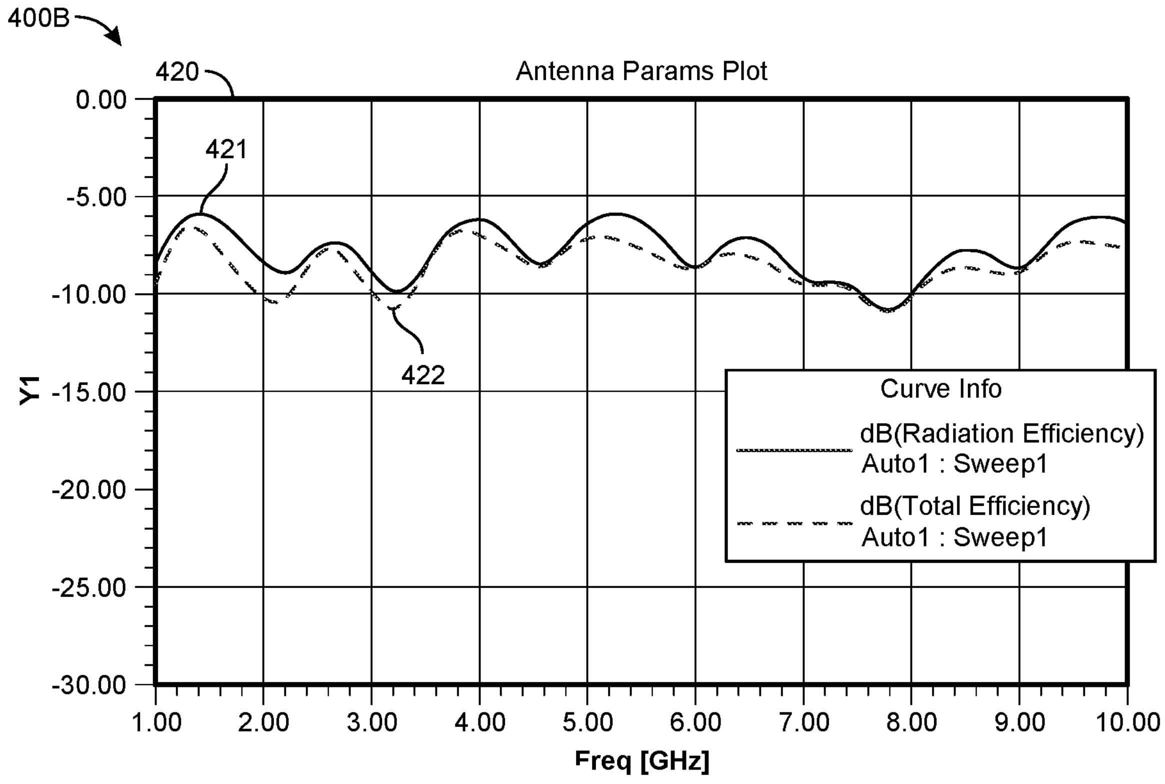
FIG. 4B illustrates a chart showing efficiency measurements of a mobile electronic device that implements one or more of the shielding structures described herein.

FIG. 3B illustrates an embodiment 300B in which the conductive frame 303 is further modified to accommodate an L-shaped dielectric spacer 308A. Indeed, the dielectric spacer may be formed in substantially any shape (e.g., rectangle-shaped, L-shaped, etc.), or in any width, height, or length, depending on the space available in the mobile electronic device. FIG. 4A illustrates an embodiment 400A showing a front perspective view of a mobile electronic device that includes a conductive frame 401 and a dielectric spacer 402. The dielectric spacer 402 may be positioned below the antenna feed 403 that electrically links to the transparent antenna 404 positioned within the lens 405. Chart 420 of FIG. 4B illustrates an embodiment 400B that includes results obtained when embodiments shown in FIGS. 3A-4A. As can be seen, the embodiments described herein may show an improved radiation efficiency 421 as well as an improved total efficiency 422.

Figure 5A:
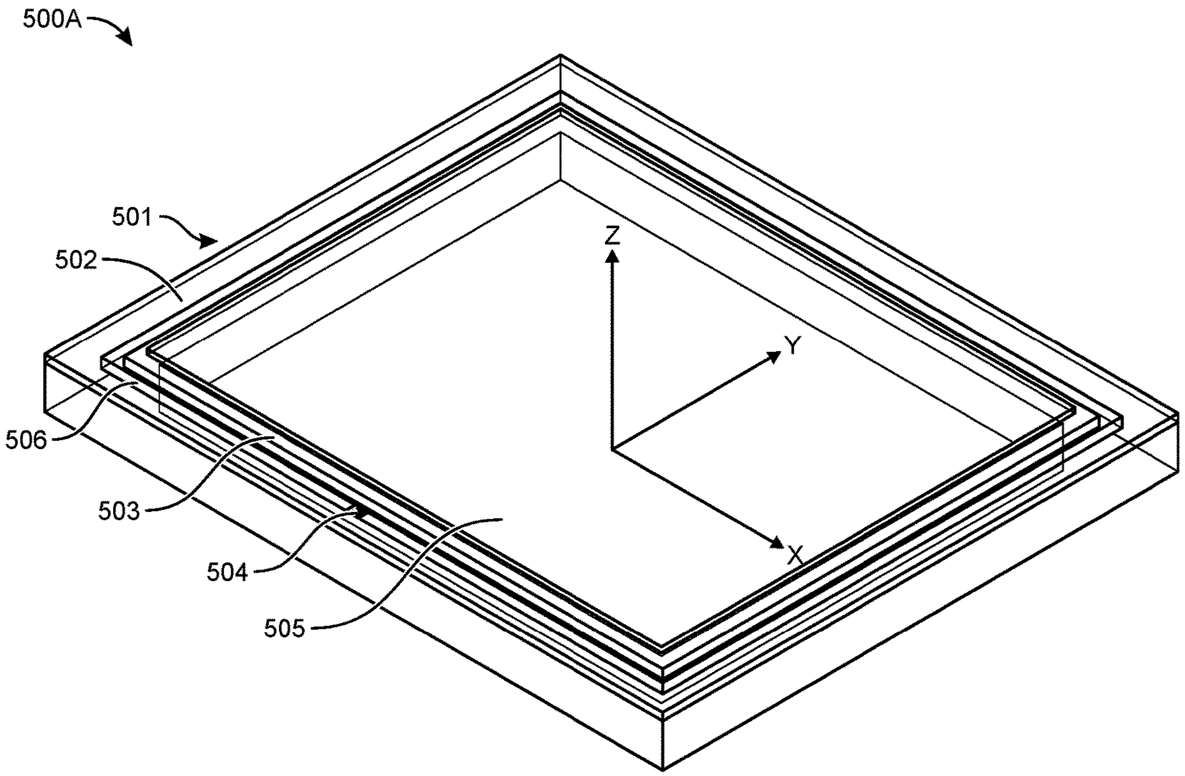
FIG. 5A illustrates a front perspective view of a portion of a mobile electronic device that implements one or more shielding structures to reduce capacitive coupling.

FIG. 5A illustrates an embodiment 500A in which the systems or mobile electronic devices 101 and 301 of FIGS. 1 and 3A, respectively, may be combined. For instance, the conductive frame 303 that includes the dielectric spacer 308 may also be connected to a transparent antenna that includes a transparent conductor 106A. Thus, in FIG. 5A, a mobile electronic device 501 may include a conductive frame 502 that has a dielectric spacer 506 as well as a modified transparent antenna 505 that includes at least a portion of transparent conductor 503 with a resistance level that is below a specified maximum threshold resistance. The transparent conductor 503 may wrap around the exterior portion of the transparent antenna 505 and may be electrically connected to an antenna feed 504. The transparent conductor 503 may also have a relatively lower resistance level that is lower than the resistance of the transparent antenna 505. Indeed, in some cases, the resistance level may be one or two orders of magnitude lower in resistance (e.g., from 2 Ohms/sq to 0.01 Ohms/sq.).

Figure 5B:
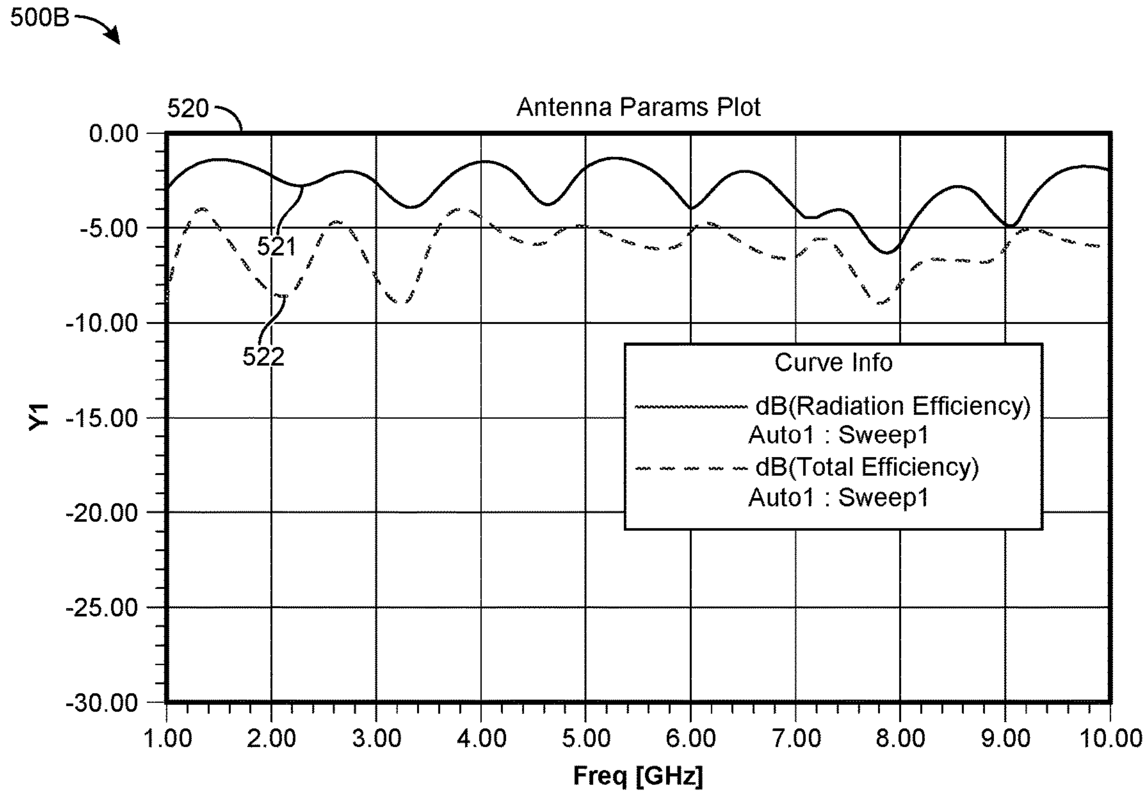
FIG. 5B illustrates a chart showing efficiency measurements of a mobile electronic device that implements one or more of the shielding structures described herein.

The dielectric spacer 506, in combination with the transparent conductor 503, may provide even greater separation between the conductive frame 502 and the transparent antenna 505. This, in turn, may result in even less conductive coupling and even greater efficiency for the transparent antenna 505. Indeed, embodiment 500B of FIG. 5B illustrates a chart 520 showing an increased radiation efficiency 521 for the mobile electronic device 501, as well as an increased total efficiency 522, especially when compared to charts 220 and 420 of FIGS. 2B and 4B, respectively.

Figure 6:
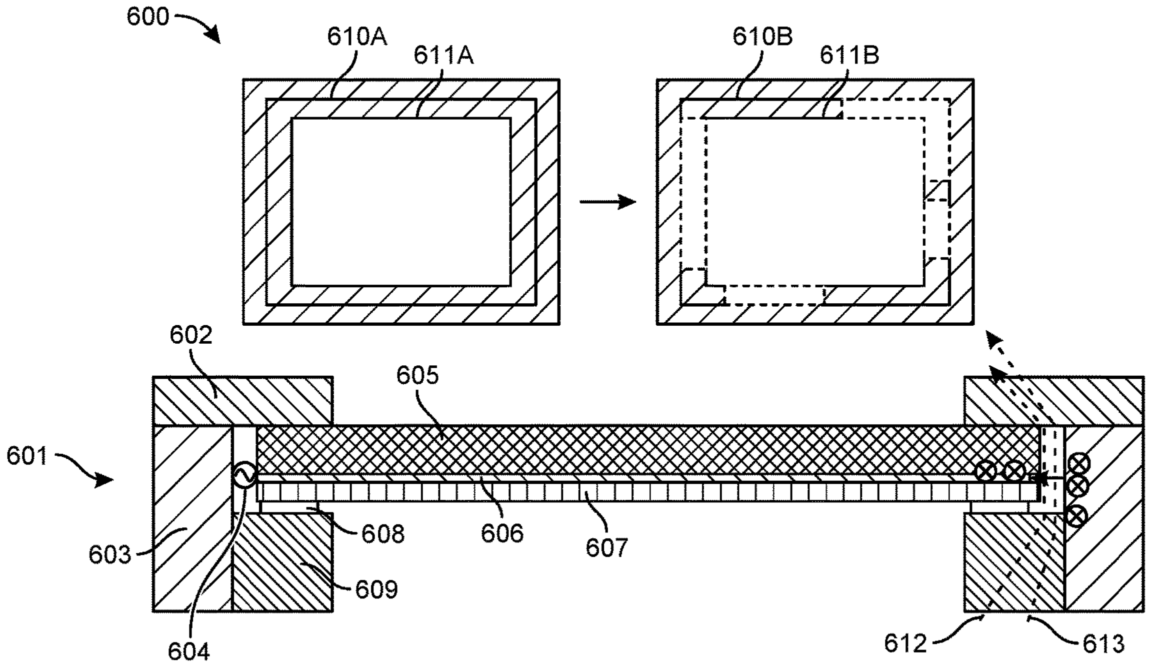
FIG. 6 illustrates an alternative embodiment of a mobile electronic device that implements one or more shielding structures to reduce capacitive coupling.

FIG. 6 illustrates an embodiment 600 of a mobile electronic device 601. The mobile electronic device 601 may be similar to the mobile electronic devices 101, 301, and 501 described above. The mobile electronic device 601 may include a conductive frame 603 and a protective cover 602. The mobile electronic device 601 may also include a lens 605 (or other transparent substrate), a transparent antenna 606, an active dimming layer 607, an antenna feed 604 and a support member 609. The support member 609 may or may not be conductive and may be attached to the conductive frame 603. The support member 609 may also be connected to the lens and/or active dimming layer 607 via an adhesive layer 608. In this embodiment, certain portions of the transparent antenna 606 and/or the transparent conductor (if used) may be removed.

Thus, as shown in the top portion of FIG. 6, a fully intact transparent antenna 610A and transparent conductor 611A may be modified to include less material, resulting in a transparent antenna 610B and transparent conductor 611B that have at least some of their material removed. Some material may be kept in place for structural reasons, but other portions may be removed to reduce the capacitive coupling that may otherwise occur between the conductive frame 603 and the transparent antenna 606. In such embodiments, the e-field 612 and h-field 613 may run to the right of the transparent antenna 606, resulting in less current remaining on the transparent conductor due to capacitive coupling. The removed perimeter portions of the transparent antenna and/or transparent conductor may create a large clearance between the transparent conductor and the conductive enclosure. This larger clearance may reduce coupling and improve antenna efficiency.

Figure 7A:
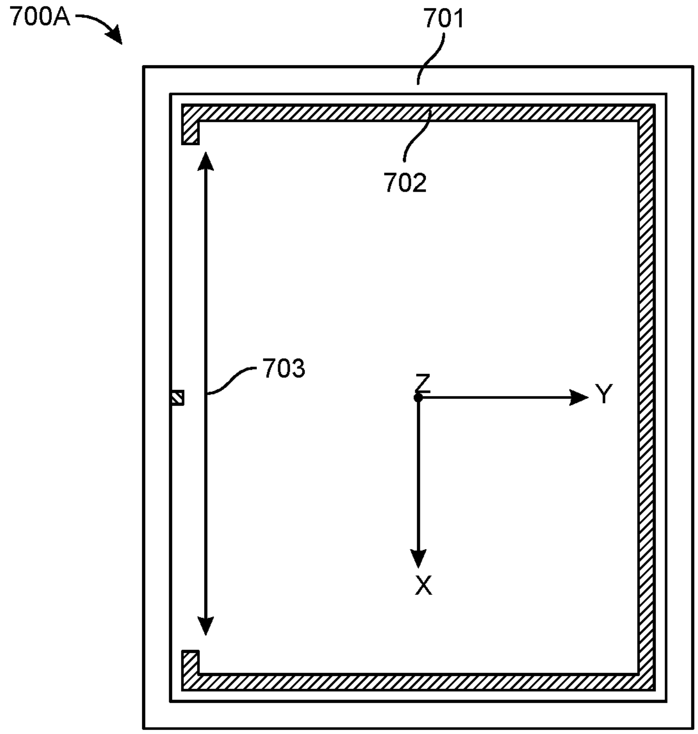
FIG. 7A illustrates a top view of a portion of a mobile electronic device that implements one or more shielding structures to reduce capacitive coupling.
Figure 7B:
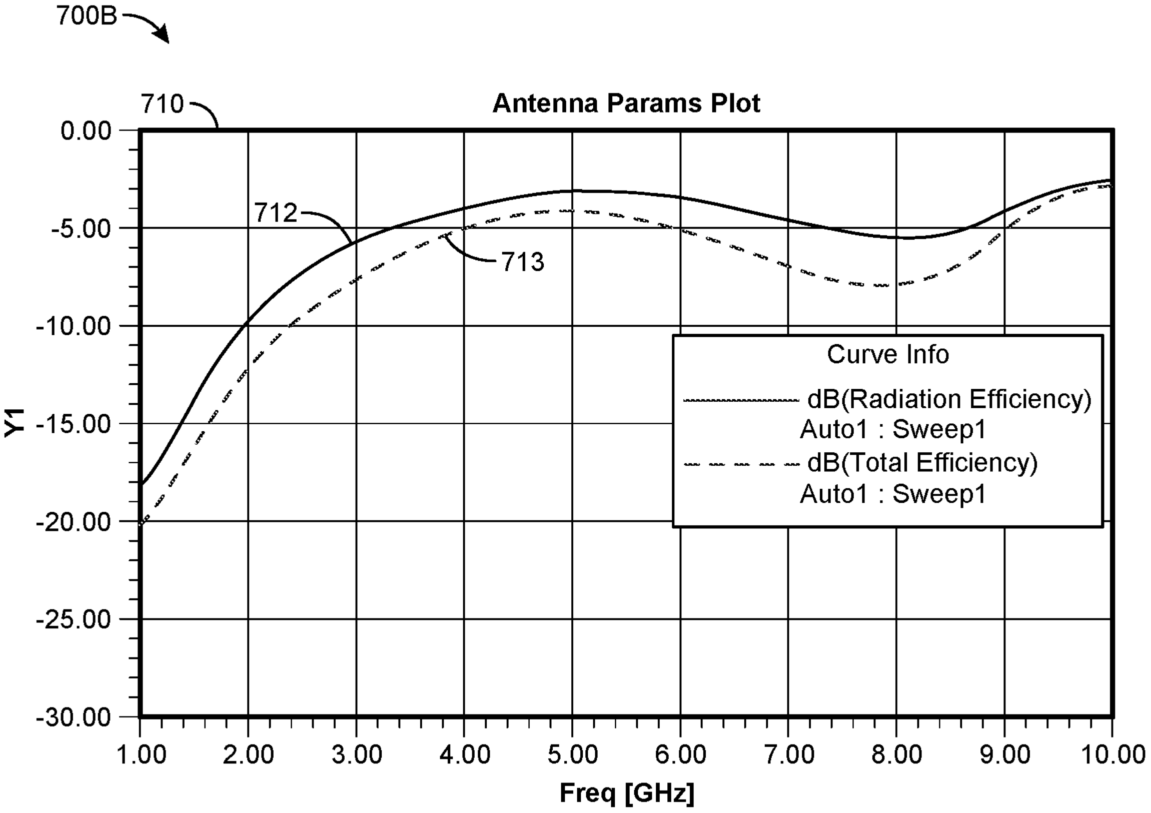
FIG. 7B illustrates a chart showing efficiency measurements of a mobile electronic device that implements one or more of the shielding structures described herein.

FIG. 7A illustrates an embodiment 700A in which the transparent antenna is modified to remove at least one perimeter segment of the transparent antenna and to remove at least a portion of the conductive frame. Thus, in FIG. 7A, on the left side, a section 703 of the conductive frame 701 and the transparent antenna 702 (and/or a transparent conductor). This section may run the entire length of the left side, or only a portion thereof. Removing both a section of conductive frame 701 and transparent antenna 702 may even further increase the clearance between the conductive frame and the transparent antenna and may further reduce capacitive coupling. Such results are indicated in chart 710 of embodiment 700B of FIG. 7B where line 712 indicates a radiation efficiency for the mobile device of embodiment 700A and where line 713 indicates a total efficiency for the mobile device of FIG. 7A.

Figure 8A:
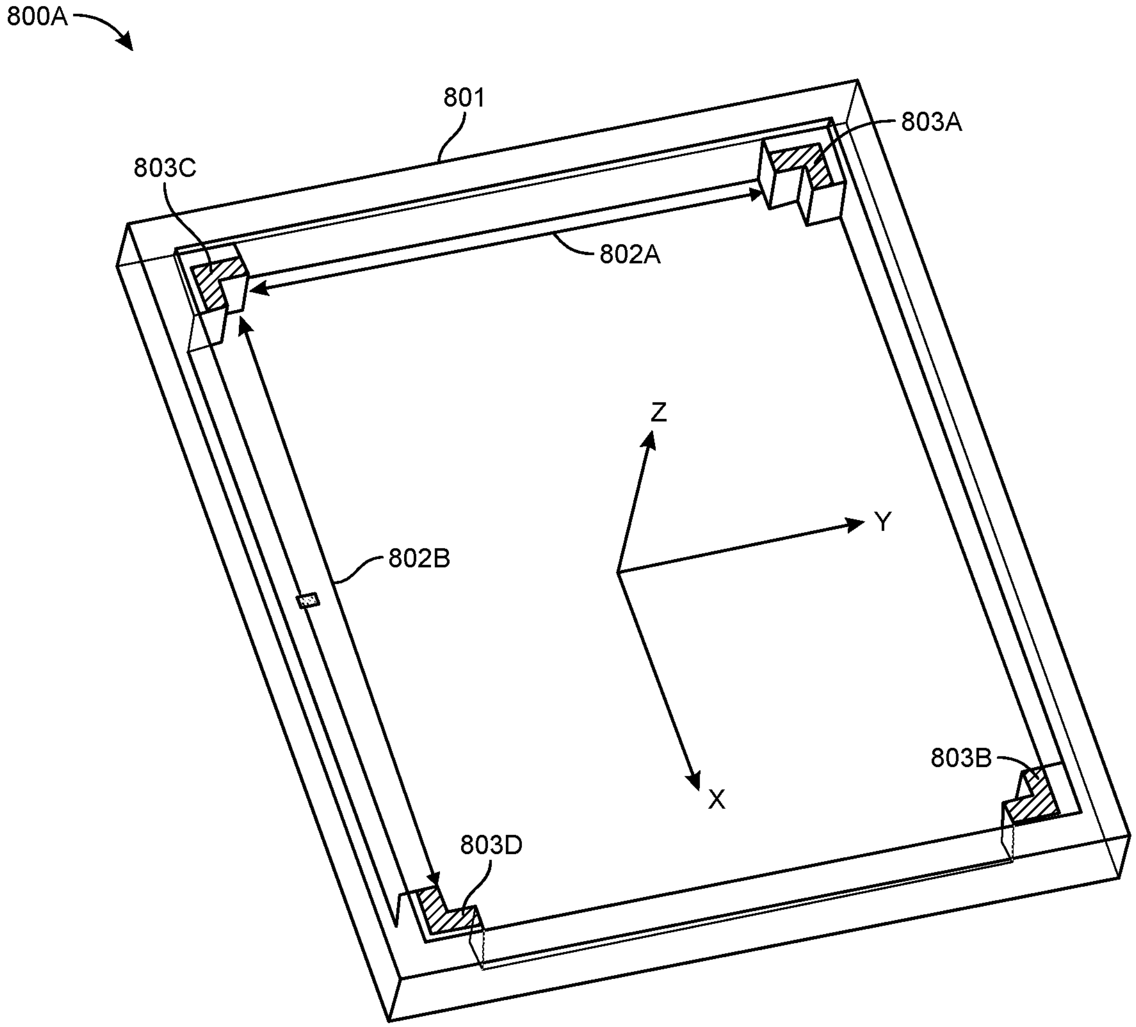
FIG. 8A illustrates a front perspective view of a portion of a mobile electronic device that implements one or more shielding structures to reduce capacitive coupling.
Figure 8B:
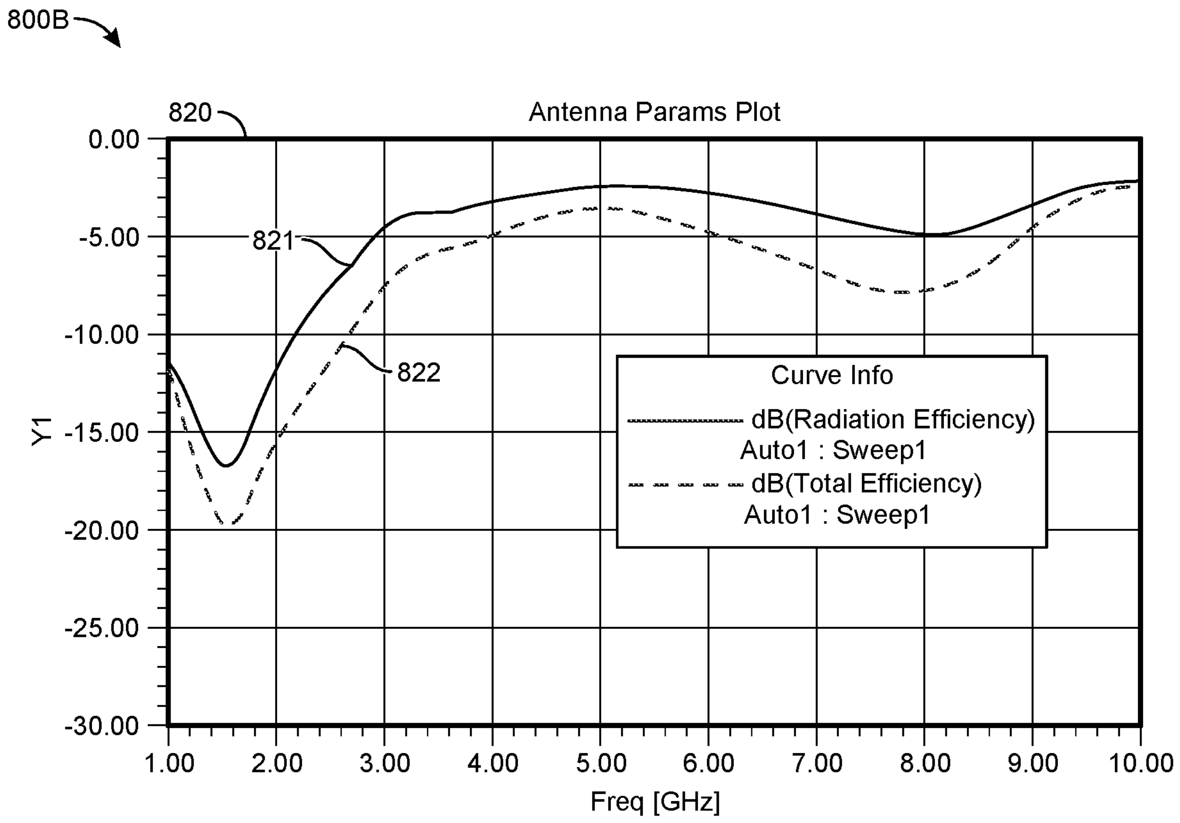
FIG. 8B illustrates a chart showing efficiency measurements of a mobile electronic device that implements one or more of the shielding structures described herein.

FIG. 8A illustrates an embodiment 800A in which a transparent antenna and/or a transparent conductor may be modified to include multiple conductive corner sections. Thus, as shown in FIG. 8A, a mobile electronic device having a conductive frame 801 and transparent antenna may be modified to remove multiple sections of the conductive frame and transparent antenna (e.g., sections 802A & 802B), leaving a plurality of conductive corner sections 803A-803D that include both conductive frame and transparent antenna. In such cases, the lens and transparent antenna may be structurally suspended within the conductive frame using the four conductive corner sections 803A-803D. This, as above, may provide even more separation between the conductive frame 801 and the transparent antenna, leading to less capacitive coupling and more efficiency. This is generally shown in chart 820 of embodiment 800B of FIG. 8B, in which 821 represents a Y1 radiation efficiency value over a spectrum of frequencies, while 822 represents a Y1 total efficiency value over the same spectrum of frequencies.

Figure 9:
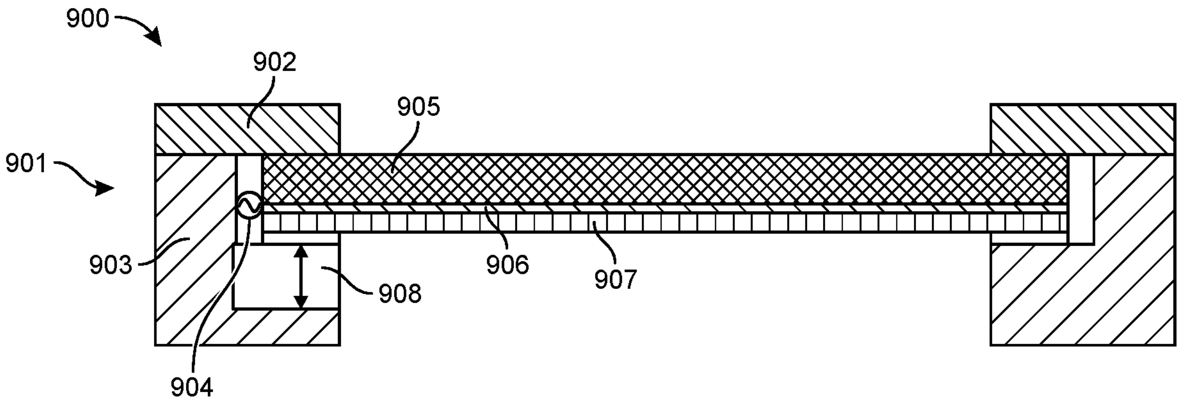
FIG. 9 illustrates an alternative embodiment of a mobile electronic device that implements one or more shielding structures to reduce capacitive coupling.

FIG. 9 illustrates an embodiment 900 of a mobile electronic device 901 that may be similar to the previously described mobile devices. The mobile electronic device 901 may include a conductive enclosure or frame 903 and a protective cover 902. The mobile electronic device 901 may further include a lens 905, a transparent antenna 906, an active dimming layer 907, and an antenna feed 904 that drives the transparent antenna 906. In this embodiment, the conductive frame 903 may include a cutout 908. This cutout may remove a portion of the conductive frame 903. The cutout 908 may also remove a portion of the transparent antenna 906.

Figure 10A:
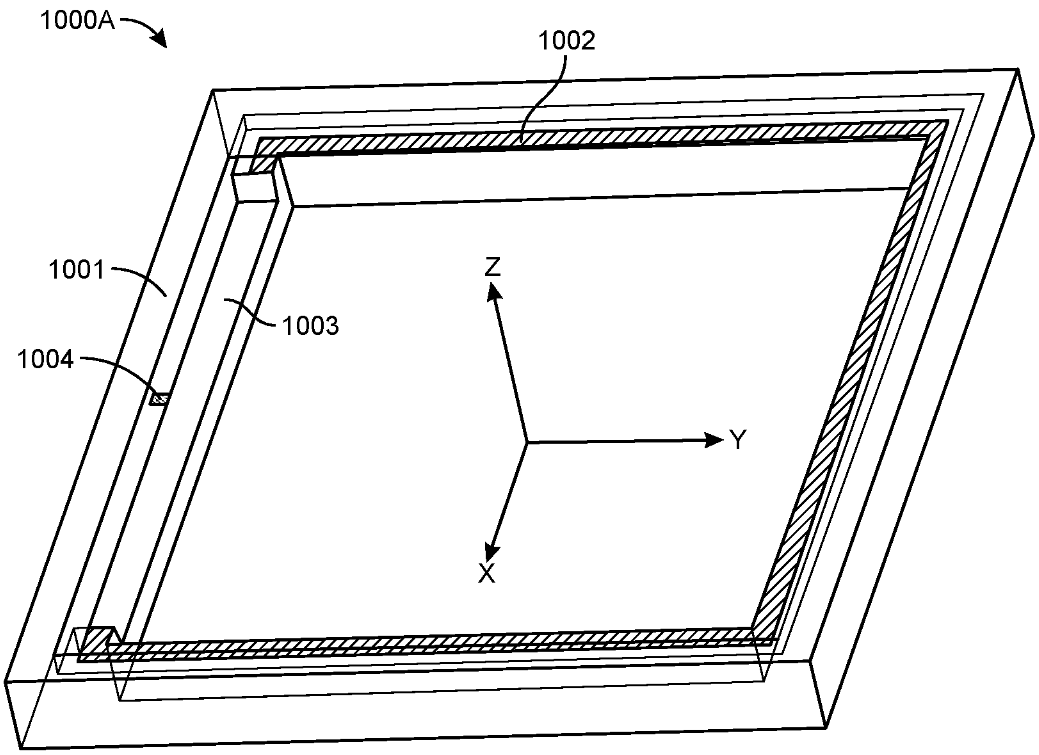
FIG. 10A illustrates a front perspective view of a portion of a mobile electronic device that implements one or more shielding structures to reduce capacitive coupling.
Figure 10B:
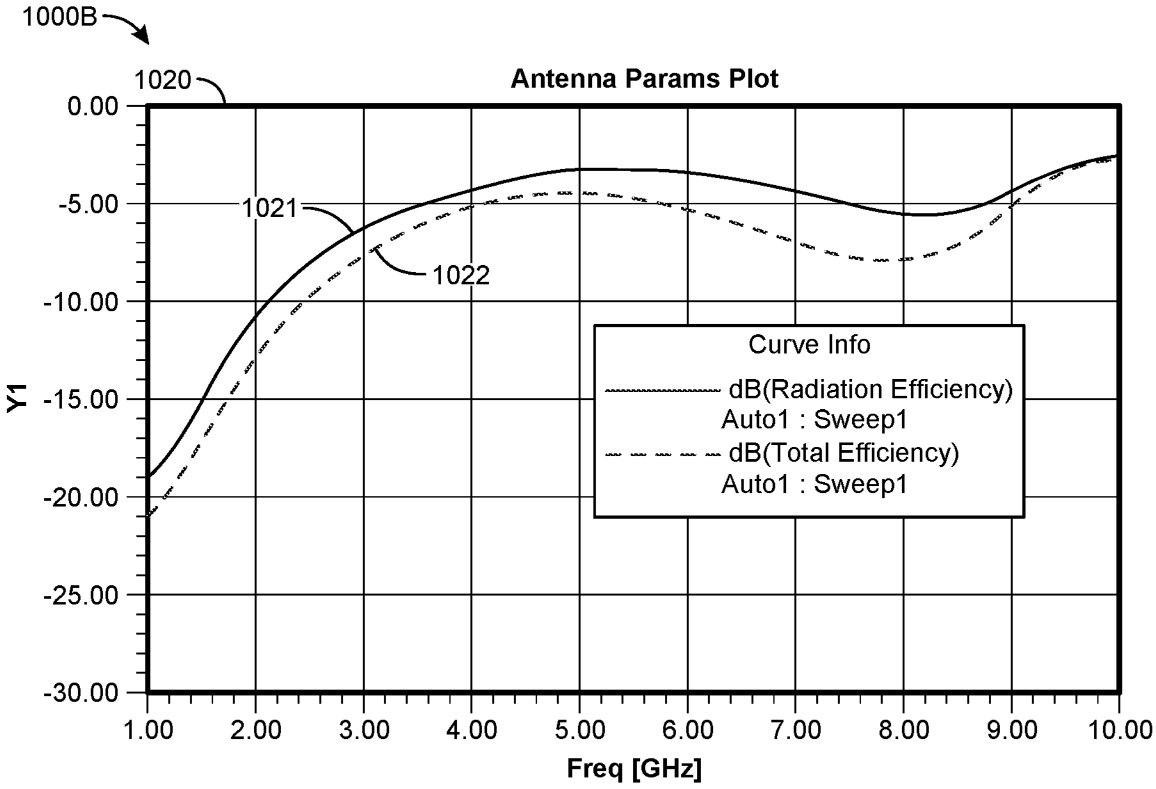
FIG. 10B illustrates a chart showing efficiency measurements of a mobile electronic device that implements one or more of the shielding structures described herein.

As shown in embodiment 1000A of FIG. 10A, a conductive frame 1001 may include a cutout portion 1003 that removes a section of the frame (e.g., 908) and potentially also removes a portion of the transparent antenna 1002. The antenna feed 1004 may electrically connect to the transparent antenna 1002 via attachment to the lens 905 or at another attachment point. As shown in embodiment 1000B of FIG. 10B, the radiation efficiency 1021 and the total efficiency 1022 in chart 1020 may be improved by increasing the size of the removed portion of the frame.

Figure 11A:
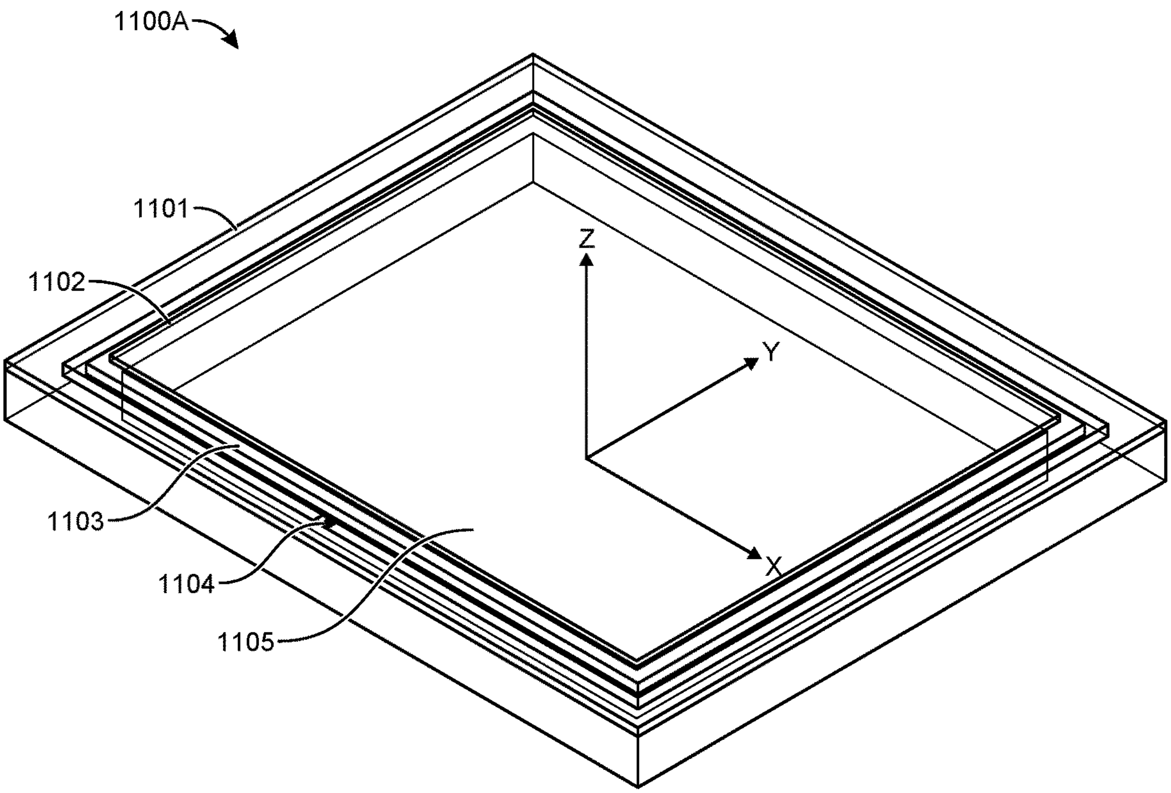
FIG. 11A illustrates a front perspective view of a portion of a mobile electronic device that implements one or more shielding structures to reduce capacitive coupling.
Figure 11B:
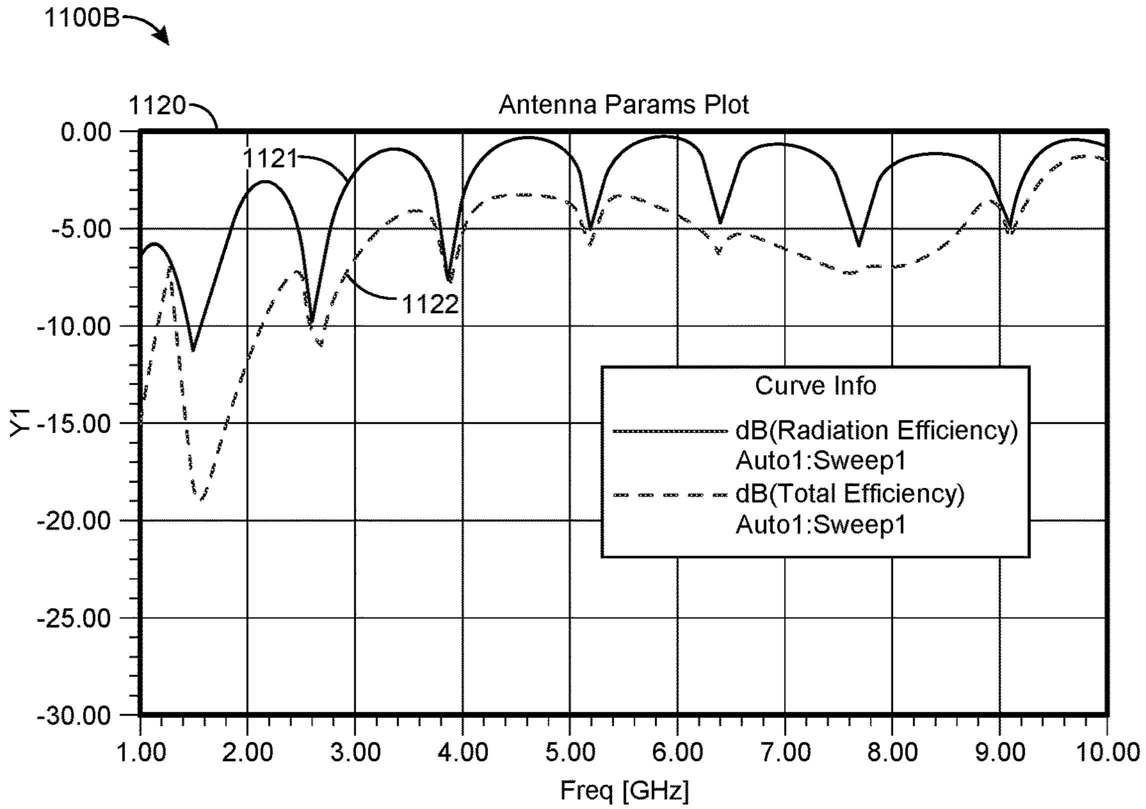
FIG. 11B illustrates a chart showing efficiency measurements of a mobile electronic device that implements one or more of the shielding structures described herein.

FIG. 11A illustrates an embodiment 1100A of a mobile electronic device that may include a conductive frame 1101, a transparent antenna 1105 with a transparent conductor 1102 (as in FIG. 1), an antenna feed 1104, and a removed section 1103 (as in FIG. 10A). In this case, the removed section 1103 may remove portions of the conductive frame 1101, the transparent antenna 1105, and/or the transparent conductor 1102. Removing any or all of these portions may further increase the gap between the conductive (metal) frame and the transparent antenna. Increasing the size of this gap may increase the efficiency of the transparent antenna due to lower conductive coupling. This is evidenced in embodiment 1100B of FIG. 11B in which chart 1120 shows an increased radiation efficiency 1121 and an increased total efficiency 1122. Each of the embodiments described above may be used alone or in conjunction with each other to maximize the efficiency of the transparent antenna and to maximally reduce the amount of capacitive coupling that occurs between the conductive frame and the transparent antenna.

In addition to the system described above, a mobile electronic device may also be provided. The mobile electronic device may include a conductive frame, at least one lens that is structurally secured by the conductive frame, a transparent antenna applied to a surface of the lens, and an antenna feed electrically positioned at an insertion point between the conductive frame and the transparent antenna. At least one of the conductive frame, the lens, the transparent antenna, or the antenna feed may be modified to reduce conductive capacitance between the conductive frame and the transparent antenna at the insertion point.

Still further, a pair of augmented reality (AR) glasses may be provided that includes a conductive frame, at least one lens that is structurally secured by the conductive frame, a transparent antenna applied to a surface of the lens, and an antenna feed electrically positioned at an insertion point between the conductive frame and the transparent antenna. At least one of the conductive frame, the lens, the transparent antenna, or the antenna feed may be modified to reduce conductive capacitance between the conductive frame and the transparent antenna at the insertion point.

EXAMPLE EMBODIMENTS

Example 1: A system may include: a conductive frame, at least one transparent substrate that is structurally secured by the conductive frame, a transparent antenna applied to a surface of the transparent substrate, and an antenna feed electrically positioned at an insertion point between the conductive frame and the transparent antenna. In this system, at least one of the conductive frame, the transparent substrate, the transparent antenna, or the antenna feed may be modified to reduce conductive capacitance between the conductive frame and the transparent antenna at the insertion point.

Example 2: The system of Example 1, wherein the conductive frame comprises a radiating element of the system.

Example 3: The system of Example 1 or Example 2, wherein the transparent antenna is modified to include at least a portion of transparent conductor with a resistance level that is below a specified maximum threshold resistance.

Example 4: The system of any of Examples 1-3, wherein remaining portions of the transparent antenna include a resistance level that is above a specified minimum threshold resistance.

Example 5: The system of any of Examples 1-4, wherein the length of the portion of transparent conductor with the specified resistance level is equivalent to the width of the conductive frame at the insertion point.

Example 6: The system of any of Examples 1-5, wherein the transparent conductor is formed onto the circumference of the transparent substrate.

Example 7: The system of any of Examples 1-6, wherein the transparent conductor follows one or more contours of the transparent substrate.

Example 8: The system of any of Examples 1-7, wherein the conductive frame is modified to include a dielectric spacer between the metallic frame and the transparent antenna.

Example 9: The system of any of Examples 1-8, wherein the dielectric spacer comprises a material that has a dielectric constant that is below a specified maximum threshold level.

Example 10: The system of any of Examples 1-9, wherein the dielectric spacer comprises at least one of a resin or a structural foam.

Example 11: The system of any of Examples 1-10, wherein the dielectric spacer is co-injected into the conductive frame.

Example 12: The system of any of Examples 1-11, wherein the dielectric spacer provides at least a minimum level of clearance between the conductive frame and the transparent antenna.

Example 13: The system of any of Examples 1-12, wherein the dielectric spacer is at least one of rectangle-shaped or L-shaped.

Example 14: The system of any of Examples 1-13, wherein the transparent antenna is modified to include at least a portion of transparent conductor with a resistance level that is below a specified maximum threshold resistance.

Example 15: A mobile electronic device may include: a conductive frame, at least one transparent substrate that is structurally secured by the conductive frame, a transparent antenna applied to a surface of the transparent substrate, and an antenna feed electrically positioned at an insertion point between the conductive frame and the transparent antenna. At least one of the conductive frame, the transparent substrate, the transparent antenna, or the antenna feed may be modified to reduce conductive capacitance between the conductive frame and the transparent antenna at the insertion point.

Example 16: The mobile electronic device of Example 15, wherein the transparent antenna is modified to remove one or more perimeter portions of the transparent antenna.

Example 17: The mobile electronic device of Example 15 or Example 16, wherein the transparent antenna is modified to include at least a portion of transparent conductor with a resistance level that is below a specified maximum threshold resistance.

Example 18: The mobile electronic device of any of Examples 15-17, wherein the transparent antenna is modified to remove at least one perimeter segment of the transparent antenna.

Example 19: The mobile electronic device of any of Examples 15-18, wherein the transparent antenna is modified to include a plurality of conductive corner sections.

Example 20: A pair of augmented reality (AR) glasses may include: a conductive frame, at least one transparent substrate that is structurally secured by the conductive frame, a transparent antenna applied to a surface of the transparent substrate, and an antenna feed electrically positioned at an insertion point between the conductive frame and the transparent antenna. At least one of the conductive frame, the transparent substrate, the transparent antenna, or the antenna feed may be modified to reduce conductive capacitance between the conductive frame and the transparent antenna at the insertion point.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1200 in FIG. 12) or that visually immerses a user in an artificial reality (such as, e.g., virtual-reality system 1300 in FIG. 13). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 12:
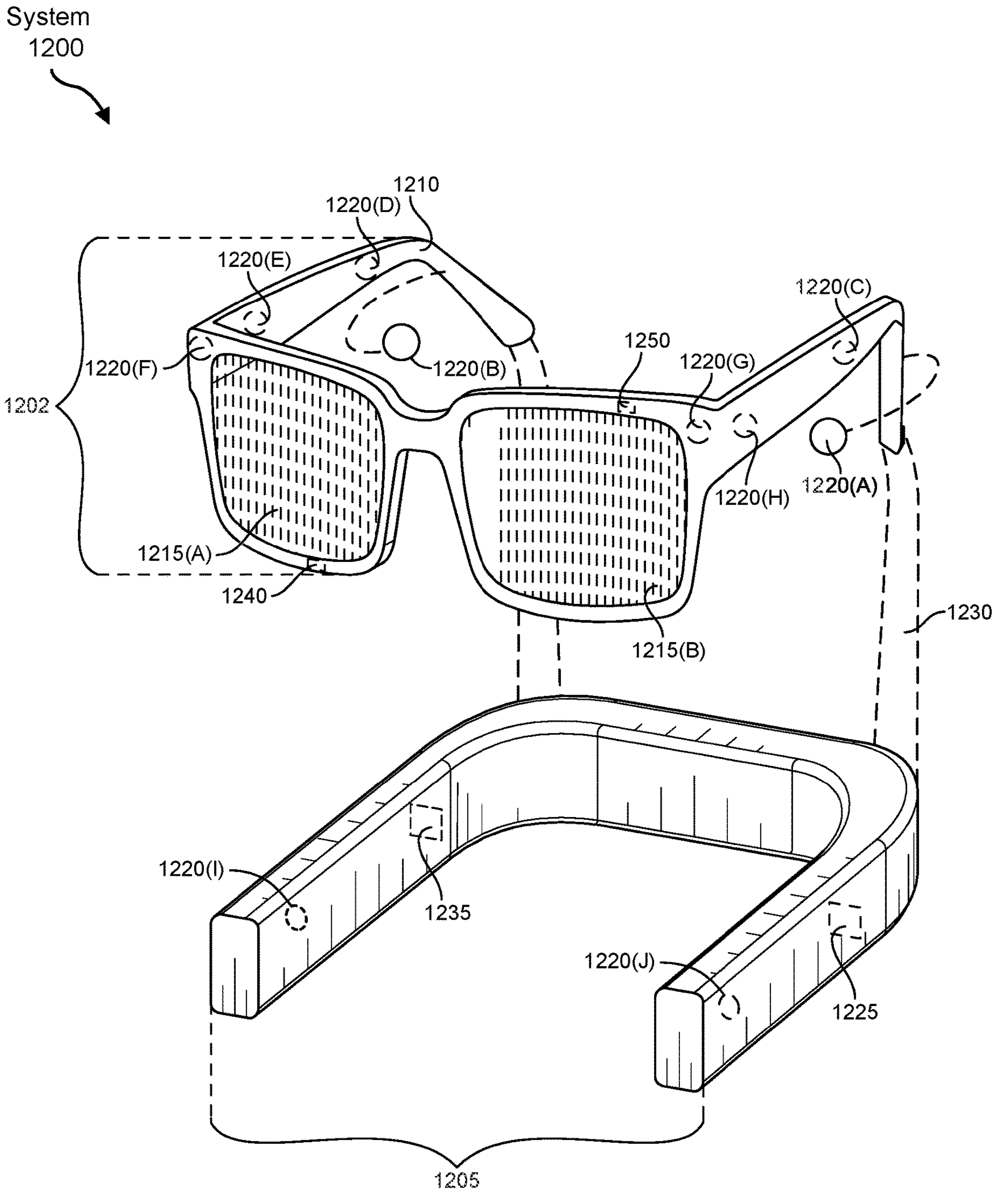
FIG. 12 is an illustration of exemplary augmented-reality glasses that may be used in connection with embodiments of this disclosure.
Figure 13:
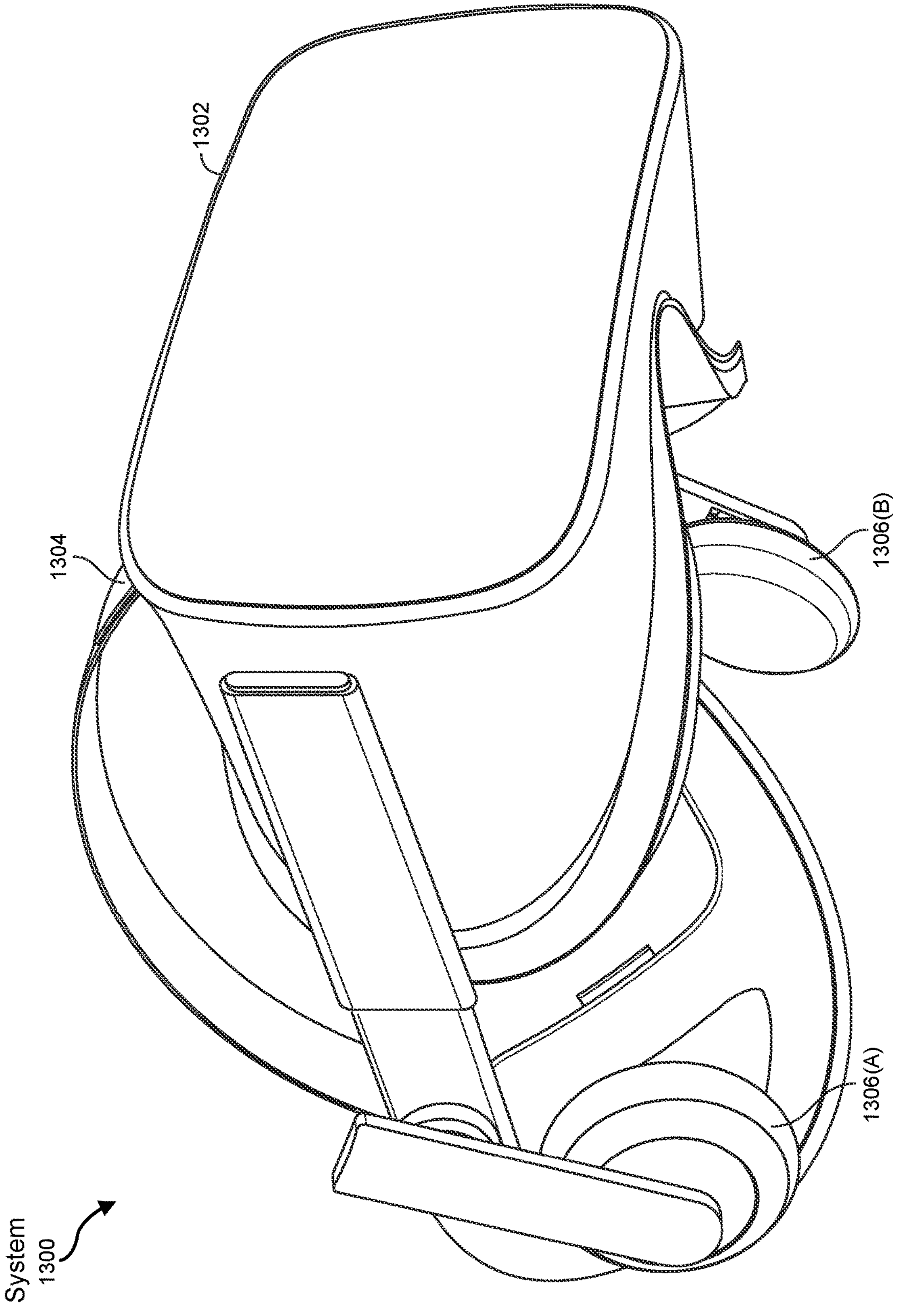
FIG. 13 is an illustration of an exemplary virtual-reality headset that may be used in connection with embodiments of this disclosure.

Turning to FIG. 12, augmented-reality system 1200 may include an eyewear device 1202 with a frame 1210 configured to hold a left display device 1215 (A) and a right display device 1215 (B) in front of a user's eyes. Display devices 1215 (A) and 1215 (B) may act together or independently to present an image or series of images to a user. While augmented-reality system 1200 includes two displays, embodiments of this disclosure may be implemented in augmented-reality systems with a single NED or more than two NEDs.

In some embodiments, augmented-reality system 1200 may include one or more sensors, such as sensor 1240. Sensor 1240 may generate measurement signals in response to motion of augmented-reality system 1200 and may be located on substantially any portion of frame 1210. Sensor 1240 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1200 may or may not include sensor 1240 or may include more than one sensor. In embodiments in which sensor 1240 includes an IMU, the IMU may generate calibration data based on measurement signals from sensor 1240. Examples of sensor 1240 may include, without limitation, accelerometers, gyroscopes, magnetometers, other suitable types of sensors that detect motion, sensors used for error correction of the IMU, or some combination thereof.

In some examples, augmented-reality system 1200 may also include a microphone array with a plurality of acoustic transducers 1220 (A)-1220 (J), referred to collectively as acoustic transducers 1220. Acoustic transducers 1220 may represent transducers that detect air pressure variations induced by sound waves. Each acoustic transducer 1220 may be configured to detect sound and convert the detected sound into an electronic format (e.g., an analog or digital format). The microphone array in FIG. 12 may include, for example, ten acoustic transducers: 1220 (A) and 1220 (B), which may be designed to be placed inside a corresponding ear of the user, acoustic transducers 1220 (C), 1220 (D), 1220 (E), 1220 (F), 1220 (G), and 1220 (H), which may be positioned at various locations on frame 1210, and/or acoustic transducers 1220 (1) and 1220 (J), which may be positioned on a corresponding neckband 1205.

In some embodiments, one or more of acoustic transducers 1220 (A)-(J) may be used as output transducers (e.g., speakers). For example, acoustic transducers 1220 (A) and/or 1220 (B) may be earbuds or any other suitable type of headphone or speaker.

The configuration of acoustic transducers 1220 of the microphone array may vary. While augmented-reality system 1200 is shown in FIG. 12 as having ten acoustic transducers 1220, the number of acoustic transducers 1220 may be greater or less than ten. In some embodiments, using higher numbers of acoustic transducers 1220 may increase the amount of audio information collected and/or the sensitivity and accuracy of the audio information. In contrast, using a lower number of acoustic transducers 1220 may decrease the computing power required by an associated controller 1250 to process the collected audio information. In addition, the position of each acoustic transducer 1220 of the microphone array may vary. For example, the position of an acoustic transducer 1220 may include a defined position on the user, a defined coordinate on frame 1210, an orientation associated with each acoustic transducer 1220, or some combination thereof.

Acoustic transducers 1220 (A) and 1220 (B) may be positioned on different parts of the user's ear, such as behind the pinna, behind the tragus, and/or within the auricle or fossa. Or, there may be additional acoustic transducers 1220 on or surrounding the ear in addition to acoustic transducers 1220 inside the ear canal. Having an acoustic transducer 1220 positioned next to an ear canal of a user may enable the microphone array to collect information on how sounds arrive at the ear canal. By positioning at least two of acoustic transducers 1220 on either side of a user's head (e.g., as binaural microphones), augmented reality system 1200 may simulate binaural hearing and capture a 3D stereo sound field around about a user's head. In some embodiments, acoustic transducers 1220 (A) and 1220 (B) may be connected to augmented-reality system 1200 via a wired connection 1230, and in other embodiments acoustic transducers 1220 (A) and 1220 (B) may be connected to augmented-reality system 1200 via a wireless connection (e.g., a BLUETOOTH connection). In still other embodiments, acoustic transducers 1220 (A) and 1220 (B) may not be used at all in conjunction with augmented-reality system 1200.

Acoustic transducers 1220 on frame 1210 may be positioned in a variety of different ways, including along the length of the temples, across the bridge, above or below display devices 1215 (A) and 1215 (B), or some combination thereof. Acoustic transducers 1220 may also be oriented such that the microphone array is able to detect sounds in a wide range of directions surrounding the user wearing the augmented-reality system 1200. In some embodiments, an optimization process may be performed during manufacturing of augmented-reality system 1200 to determine relative positioning of each acoustic transducer 1220 in the microphone array.

In some examples, augmented-reality system 1200 may include or be connected to an external device (e.g., a paired device), such as neckband 1205. Neckband 1205 generally represents any type or form of paired device. Thus, the following discussion of neckband 1205 may also apply to various other paired devices, such as charging cases, smart watches, smart phones, wrist bands, other wearable devices, hand-held controllers, tablet computers, laptop computers, other external compute devices, etc.

As shown, neckband 1205 may be coupled to eyewear device 1202 via one or more connectors. The connectors may be wired or wireless and may include electrical and/or non-electrical (e.g., structural) components. In some cases, eyewear device 1202 and neckband 1205 may operate independently without any wired or wireless connection between them. While FIG. 12 illustrates the components of eyewear device 1202 and neckband 1205 in example locations on eyewear device 1202 and neckband 1205, the components may be located elsewhere and/or distributed differently on eyewear device 1202 and/or neckband 1205. In some embodiments, the components of eyewear device 1202 and neckband 1205 may be located on one or more additional peripheral devices paired with eyewear device 1202, neckband 1205, or some combination thereof.

Pairing external devices, such as neckband 1205, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1200 may be provided by a paired device or shared between a paired device and an eyewear device, thus reducing the weight, heat profile, and form factor of the eyewear device overall while still retaining desired functionality. For example, neckband 1205 may allow components that would otherwise be included on an eyewear device to be included in neckband 1205 since users may tolerate a heavier weight load on their shoulders than they would tolerate on their heads. Neckband 1205 may also have a larger surface area over which to diffuse and disperse heat to the ambient environment. Thus, neckband 1205 may allow for greater battery and computation capacity than might otherwise have been possible on a stand-alone eyewear device. Since weight carried in neckband 1205 may be less invasive to a user than weight carried in eyewear device 1202, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 1205 may be communicatively coupled with eyewear device 1202 and/or to other devices. These other devices may provide certain functions (e.g., tracking, localizing, depth mapping, processing, storage, etc.) to augmented-reality system 1200. In the embodiment of FIG. 12, neckband 1205 may include two acoustic transducers (e.g., 1220 (*l*) and 1220 (J)) that are part of the microphone array (or potentially form their own microphone subarray). Neckband 1205 may also include a controller 1225 and a power source 1235.

Acoustic transducers 1220 (I) and 1220 (J) of neckband 1205 may be configured to detect sound and convert the detected sound into an electronic format (analog or digital). In the embodiment of FIG. 12, acoustic transducers 1220 (*l*) and 1220 (J) may be positioned on neckband 1205, thereby increasing the distance between the neckband acoustic transducers 1220 (1) and 1220 (J) and other acoustic transducers 1220 positioned on eyewear device 1202. In some cases, increasing the distance between acoustic transducers 1220 of the microphone array may improve the accuracy of beamforming performed via the microphone array. For example, if a sound is detected by acoustic transducers 1220 (C) and 1220 (D) and the distance between acoustic transducers 1220 (C) and 1220 (D) is greater than, e.g., the distance between acoustic transducers 1220 (D) and 1220 (E), the determined source location of the detected sound may be more accurate than if the sound had been detected by acoustic transducers 1220 (D) and 1220 (E).

Controller 1225 of neckband 1205 may process information generated by the sensors on neckband 1205 and/or augmented-reality system 1200. For example, controller 1225 may process information from the microphone array that describes sounds detected by the microphone array. For each detected sound, controller 1225 may perform a direction-of-arrival (DOA) estimation to estimate a direction from which the detected sound arrived at the microphone array. As the microphone array detects sounds, controller 1225 may populate an audio data set with the information. In embodiments in which augmented-reality system 1200 includes an inertial measurement unit, controller 1225 may compute all inertial and spatial calculations from the IMU located on eyewear device 1202. A connector may convey information between augmented-reality system 1200 and neckband 1205 and between augmented-reality system 1200 and controller 1225. The information may be in the form of optical data, electrical data, wireless data, or any other transmittable data form. Moving the processing of information generated by augmented-reality system 1200 to neckband 1205 may reduce weight and heat in eyewear device 1202, making it more comfortable to the user.

Power source 1235 in neckband 1205 may provide power to eyewear device 1202 and/or to neckband 1205. Power source 1235 may include, without limitation, lithium-ion batteries, lithium-polymer batteries, primary lithium batteries, alkaline batteries, or any other form of power storage. In some cases, power source 1235 may be a wired power source. Including power source 1235 on neckband 1205 instead of on eyewear device 1202 may help better distribute the weight and heat generated by power source 1235.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1300 in FIG. 13, that mostly or completely covers a user's field of view. Virtual-reality system 1300 may include a front rigid body 1302 and a band 1304 shaped to fit around a user's head. Virtual-reality system 1300 may also include output audio transducers 1306 (A) and 1306 (B). Furthermore, while not shown in FIG. 13, front rigid body 1302 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 1200 and/or virtual-reality system 1300 may include one or more liquid crystal displays (LCDs), light emitting diode (LED) displays, microLED displays, organic LED (OLED) displays, digital light projector (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 1200 and/or virtual-reality system 1300 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1200 and/or virtual-reality system 1300 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, bodysuits, handheld controllers, environmental devices (e.g., chairs, floor mats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
- a conductive frame;
- at least one transparent substrate that is structurally secured by the conductive frame;
- a transparent antenna applied to a surface of the transparent substrate;
- an antenna feed electrically positioned at an insertion point between the conductive frame and the transparent antenna; and
- a dielectric spacer that is disposed between a portion of the transparent antenna and a portion of the conductive frame overlapping with the portion of the transparent antenna to reduce conductive capacitance between the conductive frame and the transparent antenna at the insertion point, wherein the insertion point is located within a gap formed between a surface of the conductive frame and a surface that comprises at least an outer edge of the transparent substrate and an outer edge of the transparent antenna.

2. The system of claim 1, wherein the dielectric spacer is disposed between (i) a surface of a portion of the transparent antenna and (ii) a surface of a portion of the conductive frame that overlaps with the portion of the transparent antenna, the surface of the portion of the conductive frame facing toward the surface of the portion of the transparent antenna, wherein the conductive frame comprises a radiating element of the system, and
- wherein the insertion point is adjacent to the dielectric spacer.

3. The system of claim 1, wherein the transparent antenna is modified to include at least a portion of a transparent conductor with a resistance level that is below a specified maximum threshold resistance.

4. The system of claim 3, wherein one or more remaining portions of the transparent antenna include a resistance level that is above a specified minimum threshold resistance.

5. The system of claim 3, wherein a length of at least the portion of the transparent conductor with the specified resistance level is equivalent to a width of the conductive frame at the insertion point.

6. The system of claim 3, wherein the transparent conductor is formed onto a circumference of the transparent substrate.

7. The system of claim 6, wherein the transparent conductor follows one or more contours of the transparent substrate.

8. The system of claim 1, wherein the conductive frame is modified to include the dielectric spacer between the conductive frame and the transparent antenna.

9. The system of claim 1, wherein the dielectric spacer comprises a material that has a dielectric constant that is below a specified maximum threshold level.

10. The system of claim 9, wherein the dielectric spacer comprises at least one of a resin or a structural foam.

11. The system of claim 1, wherein the dielectric spacer is co-injected into the conductive frame.

12. The system of claim 1, wherein the dielectric spacer provides at least a minimum level of clearance between the conductive frame and the transparent antenna.

13. The system of claim 8, wherein the dielectric spacer is at least one of rectangle-shaped or L-shaped.

14. The system of claim 8, wherein the transparent antenna is modified to include at least a portion of a transparent conductor with a resistance level that is below a specified maximum threshold resistance.

* * * * *